United States Patent

Martin

Patent Number: 5,772,256
Date of Patent: Jun. 30, 1998

[54] PIPE SUPPORT SYSTEM

[76] Inventor: Lavon Martin, 909 S. Fourth St., LaPorte, Tex. 77571

[21] Appl. No.: 680,142

[22] Filed: Jul. 15, 1996

[51] Int. Cl.⁶ .................................................... F16L 3/00
[52] U.S. Cl. ...................... 285/61; 285/133.4; 285/136.1
[58] Field of Search ................................. 285/61, 62, 63, 285/64, 30, 156, 133.4, 133.1, 133.2, 133.3, 133.5, 133.6, 136.1

[56] References Cited

U.S. PATENT DOCUMENTS

| | | | |
|---|---|---|---|
| 151,704 | 6/1874 | Jenks | 285/61 |
| 396,080 | 1/1889 | Gilliam . | |
| 584,804 | 6/1897 | Winton | 285/61 |
| 1,086,143 | 2/1914 | Davidson . | |
| 1,115,912 | 11/1914 | Dodson . | |
| 1,811,501 | 6/1931 | Holmes . | |
| 2,374,348 | 4/1945 | Harding | 285/156 X |
| 2,376,412 | 5/1945 | Arthur | 285/210 |
| 2,480,034 | 8/1949 | Lapp | 285/210 |
| 2,487,939 | 11/1949 | Norton | 285/210 |
| 2,547,826 | 4/1951 | Kirschner | 285/61 X |
| 2,576,630 | 11/1951 | Mueller et al. | 285/30 |
| 2,599,280 | 6/1952 | Phillips | 285/61 |
| 2,757,024 | 7/1956 | Lowe et al. | 285/156 |
| 2,892,641 | 6/1959 | Ford | 285/30 |
| 3,068,904 | 12/1962 | Moody | 138/37 |
| 3,088,755 | 5/1963 | Klamm | 285/64 |

*Primary Examiner*—Dave W. Arola
*Attorney, Agent, or Firm*—Harrison & Egbert

[57] ABSTRACT

A pipe support system including a first pipe, a second pipe, a dead leg pipe and a T-shaped connector. The T-shaped connector has a first opening at a first end, a second opening at a second end, and a third opening at a third end. The connector has a fluid passageway extending between the first and second openings. The third opening is blocked from fluid communication with the fluid passageway. The first end is affixed within the first opening. The second pipe is affixed within the second opening. The dead leg pipe is affixed within the third opening. A support rack extends upwardly from a support surface and receives the dead leg pipe therein distal of the connector.

11 Claims, 3 Drawing Sheets

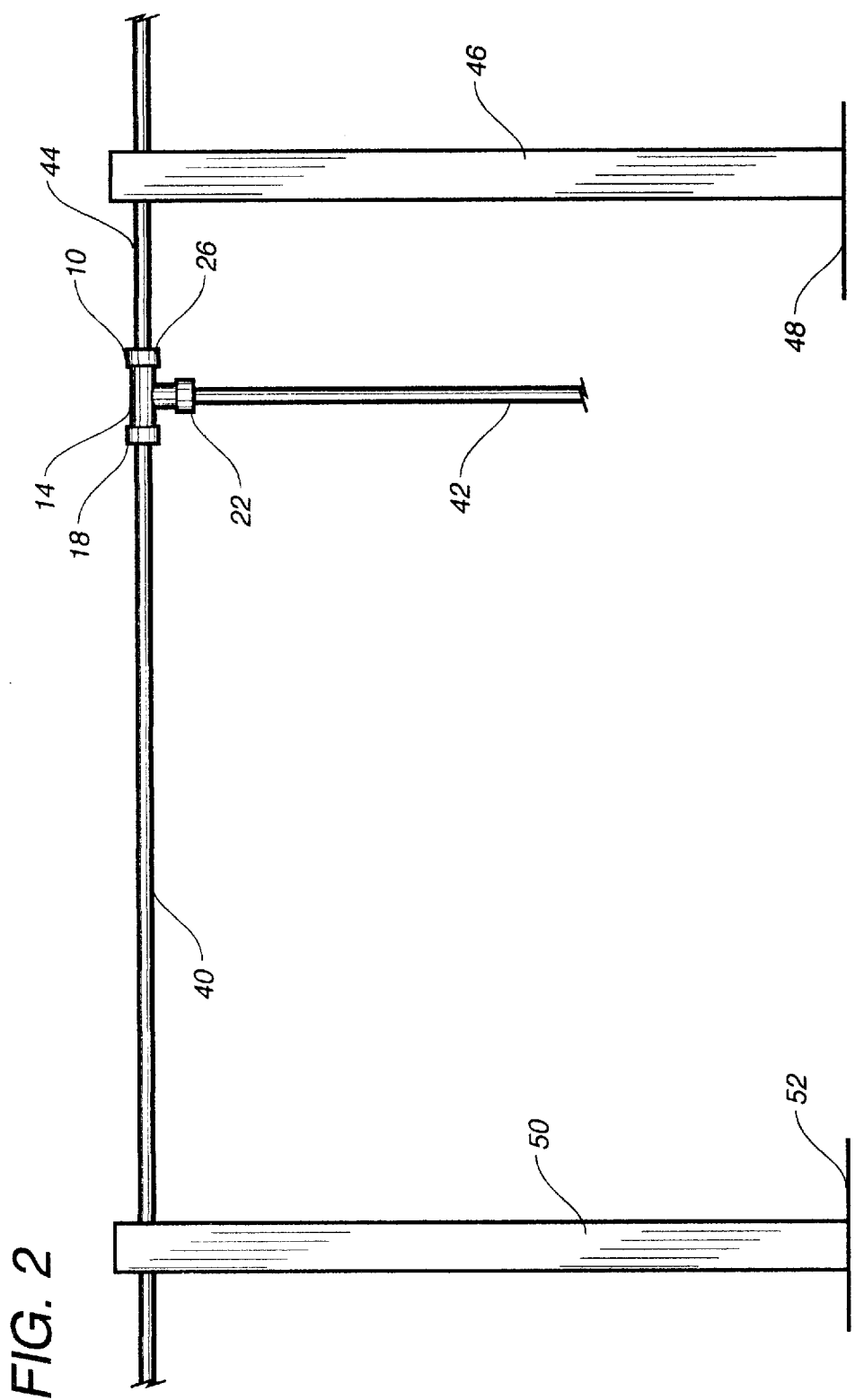

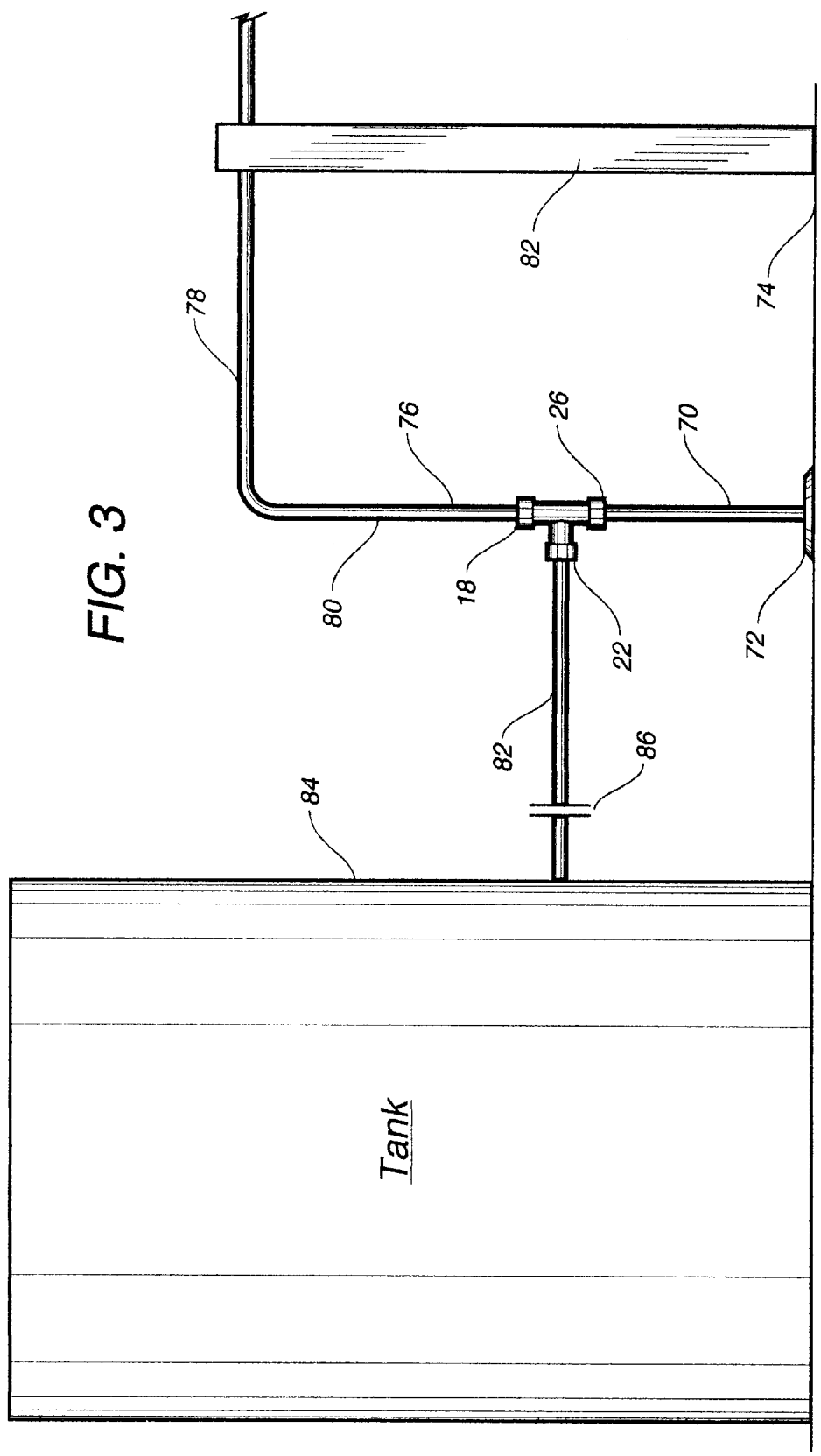

PIPE SUPPORT SYSTEM

TECHNICAL FIELD

The present invention relates to pipe connectors and pipe fittings. More particularly, the present invention relates to systems for the support of pipes in a process industry.

BACKGROUND ART

In process industries, a large number of pipes extend in a variety of directions throughout the plant. As improvements and changes to the process occur, there is often a need to direct new pipes into the main process line or to create diversions and new pathways for fluid flow. After a period of time, the pipes of the process industry can resemble a "spiderweb" of pipes.

Whenever a large number of pipes are connected together, the actual weight of the pipe, and associated valving and instrumentation, can create a large load onto the pipes. As a result, the pipes may unnaturally deflect and deform because of the imposition of such weight. As a result, it is often necessary to create structure so as to support the weight of the pipes and the pipe connections. A common technique for the support of the weight of the pipe is the attachment of a "dead leg" pipe to a T-shaped connector.

T-shaped connectors are often employed in process industries so as to cause the flow of one line into another line. It is also employed so as to cause the flow of two separate lines to pass into a single outlet. Conventionally, these T-shaped connectors will have a linear flowway extending between opposite ends of the connector and a transverse flowway extending into the linear flowway. As a result, whenever the T-shaped connector is employed, a total of three pipes will be connected to the three openings of the connector.

The T-shaped connector is used for the dead leg support. In order to use the T-shaped connector for the dead leg, a plug is inserted into one of the openings of the T-shaped connector. The plug serves to prevent fluid flow through that end of the connector. The plug is then welded into the opening. After the plug is welded into the opening, a pipe is then welded to an end of the plug. In order to properly weld the pipe to the end of the plug, the end of the pipe must be bevelled so as to form a proper receptacle for the weld. Several fixtures and manipulations are required so as to properly position the pipe to the end of the plug so as to connect the pipe to the plug. After the pipe is welded to the end of the plug, another portion of the pipe can be supported by a support rack. As a result, the T-shaped connector can be used for the support of the piping structure.

Unfortunately, the process of welding the pipe to the T-shaped connector has many problems. First, and foremost, this is a very difficult and time consuming operation. A fixture is required to properly position the pipe relative to the outwardly extending end of the plug. Furthermore, a great deal of time is required so as to properly bevel the end of the pipe so as to form a receptacle for the weld. Even after these operations are completed, it is a common problem that the dead leg pipe is not in proper linear alignment with the T-shaped connector. As a result, the installation of the dead leg pipe onto the support surface may impart undesirable forces to the piping system.

In certain circumstances in the process industry, structures are not available with which to support the weight of the pipe. This is particularly the case where the pipe is to be connected to a tank. Normally, a pipe will extend for a great distance to the connector of the tank. As a result, the connector of the tank must support a great deal of the weight of the pipe. Under certain circumstances, the connector of the tank can deform or deflect under the weight of the pipe so as to interfere with the proper sealing connection of the pipe to the tank. As a result, a need has developed in which to allow a support to be incorporated along the length of the pipe so as to facilitate the support of the pipe.

It is an object of the present invention to provide a connector that allows for the installation of a dead leg pipe.

It is another object of the present invention to provide a connector which allows a dead leg pipe to be connected in an efficient and simple manner.

It is a further object of the present invention to provide a connector that reduces the time and effort required to affix the dead leg pipe to the connector.

It is another object of the present invention to provide a pipe support system which supports the weight of the pipe in the process industry.

These and other objects and advantages of the present invention will become apparent from a reading of the attached specification and appended claims.

SUMMARY OF THE INVENTION

The present invention is a pipe support system that comprises a first pipe, a second pipe, a dead leg pipe and a T-shaped connector. The T-shaped connector has a first opening at a first end, a second opening at a second end, and a third opening at a third end. The connector has a fluid passageway extending between the first and second openings. The third opening is blocked from fluid communication with the fluid passageway. The first pipe is affixed within the first opening. The second pipe is affixed within the second opening. The dead leg pipe is affixed within the third opening.

A first support rack extends upwardly from a support surface. The first support rack receives a surface of the dead leg pipe therein. The dead leg pipe is axially aligned with the first pipe. The second pipe has a longitudinal axis which is transverse to the first pipe and to the dead leg pipe. A second support rack is provided which extends upwardly from the support surface. The second support rack receives the first pipe therein distal the connector. The connector is positioned between the first and second support racks.

In another embodiment of the present invention, the dead leg pipe has a base member affixed to an end of the dead leg pipe opposite the connector. The base member is in abutment with a support surface. In this embodiment, the first pipe is an L-shaped pipe with a horizontal portion and a vertical portion. The support rack extends upwardly from the support surface so as to receive the horizontal portion of the pipe therein. The vertical portion extends from the horizontal portion to the connector. The first pipe and the dead leg pipe have longitudinal axes which are in linear alignment. The longitudinal axes extend transverse to the base member. The second pipe extends transverse to the first pipe and to the dead leg pipe. The second pipe is connected to a tank at an end opposite the second end of the connector.

The T-shaped connector has a first end which is offset by 90° C. from the second end. The fluid passageway has a first portion which extends to the first opening transverse to a second portion extending to the second opening. The third end is offset by 180° C. from the first end. The third opening is axially aligned with the first opening. The connector has a blocking section integrally formed between an end of the first portion of the fluid passageway and the third opening.

The first, second and third openings are threaded so as to threadedly receive pipe sections therein.

BRIEF DESCRIPTION OF THE DRAWINGS

FIG. 2 is a diagrammatic illustration of the pipe support system of the preferred embodiment of the present invention.

FIG. 3 is a diagrammatic illustration of an alternative embodiment of the pipe support system of the present invention.

DETAILED DESCRIPTION OF THE INVENTION

Figure 1:
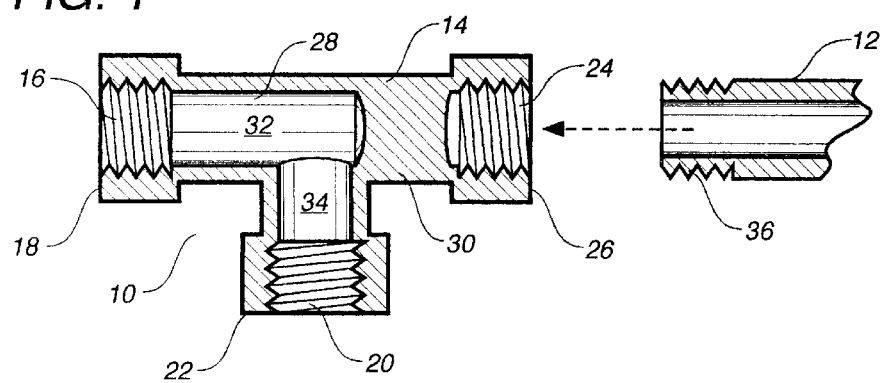
FIG. 1 is a cross-sectional exploded view of the pipe fittings of the present invention.

Referring to FIG. 1, there is shown at 10 the pipe fitting in accordance with the present invention. Also, as shown in FIG. 1, it can be seen how the pipe fitting 10 serves to receive a dead leg pipe 12 therein. The pipe fitting 10 comprising a T-shaped connector 14 which has a first opening 16 and a first end 18 of the connector 14, a second opening 20 at a second end 22 of the connector 14, and a third opening 24 at a third end 26 of the connector 14. It can be seen that the connector 14 has a fluid passageway 28 extending between the first opening 16 and the second opening 20. The third opening 24 is blocked from fluid communication with the fluid passageway 28 by the blocking section 30. The blocking section 30 is integrally formed with the connector 14.

Initially, it can be seen that the first end 18 of the connector 14 is offset by 90° C. from the second end 22. The fluid passageway 28 has a portion 32 extending to the first opening 16 in transverse relationship to a second portion 34 of the fluid passageway 28. The second portion 34 extends to the second opening 20. Normally, the fluid passageway 28 is formed in the pipe fitting 10 by drilling into the cast body of the connector 14. Initially, the end first end 18 of the connector 14 is drilled a desired distance into the body of the connector 14. Next, the second end 22 is drilled into the body of the connector 14 until the drill hole intersects with the first portion 32 of the fluid passageway. As a result, the second opening 20 will be in fluid communication with the first opening 16. Unlike prior techniques for the formation of T-shaped connectors, the first portion 32 will not extend all the way through the body of the connector 14. The end of the drill hole which forms the first portion 32 of the fluid passageway 28 stops short of reaching the third opening 24. As a result, fluid passing through the fluid passageway 28 is prevented from entering the third opening 24. The first opening 16 is then threaded so as to form female threads which mate with the male threads of an adjoining pipe section. Similarly, the second opening 20 is threaded with female threads so as to join with the male threads of an adjoining pipe section. As a result, the connector 14 serves to establish a fluid flow connection between a pipe received by the opening 16 with a pipe received by the opening 22.

The third end 26 of the connector 14 is offset by approximately 180° C. from the first end 18. The third opening 24 is axially aligned with the first opening 16. The blocking section 30 is integrally formed with the material of the connector 14 between an end of the first portion 32 of the fluid passageway 28 and the third opening 24. As can be seen in FIG. 1, the dead leg pipe 12 includes male threads 36 which are threadedly received by the female threads in the opening 28. In normal practice, the dead leg pipe 12 will be threadedly received within the third opening 24 so as to extend outwardly therefrom. So as to establish a desired connection, it is proper to weld the dead leg pipe 12 to the end 26 of the connector 14 after the threads 36 have been threadedly received within the opening 24.

FIG. 2 shows how the pipe fitting 10 is installed into a piping system so as to provide the pipe support system of the present invention. Initially, the pipe support system of the present invention includes a first pipe 40, a second pipe 42 and a dead leg pipe 44. As can be seen, the first pipe 40 is affixed within the opening at the first end 18 of the connector 14. The second pipe 42 is affixed within the opening of the second end 22 of the connector 14. The dead leg pipe 44 is affixed within the third opening at the third end 26 of the connector 14. As shown in FIG. 2, fluid flow will extend through pipe 40, through the fluid passageway 28 on the interior of the connector 14 and into the second pipe 42. No fluid flow occurs into the dead leg pipe 44.

A support rack 46 extends upwardly from a support surface 48. The support rack 46 serves to receive the dead leg pipe 44 therein. As such, the support rack 46 will provide sufficient support so as to offset the weight on the pipe 40 caused by the downwardly extending pipe 42. If the dead leg pipe 44 was not installed so as to be supported by the support rack 46, then there would be a tendency of the pipe 40 to deflect downwardly under the weight of the pipe 42.

As can be seen in FIG. 2, the dead leg pipe 44 is axially aligned with the first pipe 40. The second pipe 42 has a longitudinal axis which is transverse to the first pipe 40 and to the dead leg pipe 44. A second support rack 50 extends upwardly from the support surface 52. This support rack 50 serves to receive the first pipe 40 therein. As a result, the weight of the pipe 40, and the associated pipe 42, is supported by the support racks 46 and 50. The connector 14 is positioned between the support rack 46 and the support rack 50. As can be seen, the support racks 46 and 48 maintain the level orientation of the first pipe 40 and serves to resist the deflecting forces caused by the weight of the pipe 42.

The pipe fitting 10 of the present invention is designed for the steel piping industry to save labor and material costs. In particular, these savings are realized at the various points in the piping runs where a "dead leg" support is needed to support the turns of the pipe. The pipe fitting 10 of the present invention supports the pipe, keeps the pipe level and straight, and also keeps the support portion itself free of the processed fluids. Pipe construction standards are already set up to keep supports free of fluid because the supports are in a position of being worn from pipe movement.

The pipe fitting 10 of the present invention functions as a 90° C. elbow. The openings of the pipe fitting 10 of the present invention can be socket weld pipe or threaded pipe depending on the particular applications. All of the openings are standard pipe sizes and all dimensions can be different in accordance with the pipe size being used. The dimensions can also be detailed in accordance with ANSI specifications.

The fitting 10 of the present invention will save a great deal of expense for the piping industry. It is a much more efficient connection for supports. Because this fitting avoids leakage, it is of great value in preventing environmental contamination. The use of the fitting 10 of the present invention avoids the doubling up of extra fittings being used in the industry. With the single fitting 10 of the present invention, a much more efficient application can be achieved while accomplishing the objectives with greater quality. In general, the use of the fitting 10 of the present invention can save money in the building of chemical plants, refineries, or any other type of process piping systems. The pipe fitting 10 of the present invention can be made of carbon steel, stainless steel, HASTELOY (TM) and various other exotic steel materials.

FIG. 3 shows how the connector 14 of the present invention can be employed as a pipe support stand. As can be seen in FIG. 3, the dead leg pipe 70 is received within the third opening at the third end 26 of the connector 14. The dead leg pipe 70 extends downwardly from the end 26 of the connector 14. The dead leg pipe 70 extends downwardly from the end 26 of connector 14 and has a base member 72 affixed thereto. The base member 72 is affixed to the dead leg pipe 70 opposite the end 26 of the connector 14. The base member 72 rests in flat abutment onto the support surface 74.

It can be seen in FIG. 3 that the first pipe 76 is a L-shaped pipe having a horizontal portion 78 and a vertical portion 80. The support system of this embodiment of the present invention also includes a support rack 82 which extends upwardly from the support surface 74. The horizontal portion 78 of the pipe 76 is received within the support rack 82. The vertical portion 80 of the pipe 76 extends downwardly from the horizontal portion 78 and is received within the first end 18 of the connector 14. The vertical portion 80 of the first pipe 76 and the dead leg pipe 70 have longitudinal axes which are in linear alignment. The longitudinal axes of the dead leg pipe 70 and the vertical portion of the first pipe 76 extend transverse to the base member 72 and to the support surface 74. The second pipe 82 extends transverse to the vertical portion 80 of the first pipe 76 and transverse to the dead leg pipe 70. The second pipe 82 is connected to a tank 84 at one end and is connected to the second end 22 of the connector 14.

As can be seen, the support system as shown in FIG. 3 is another use for the fitting 10 of the present invention. The fitting 10 of the present invention provides for a pipe support stand where there is no rack to support the pipe runs. As shown in FIG. 3, this system is applicable to a tank farm where piping structures are not available. The nozzle 86 of the tank 84 is usually not strong enough to support the entire weight of the pipe. The use of the base member 72 on the dead leg pipe 70 provides strong structural support for the second pipe 82 extending to the tank 84.

Figure 4:
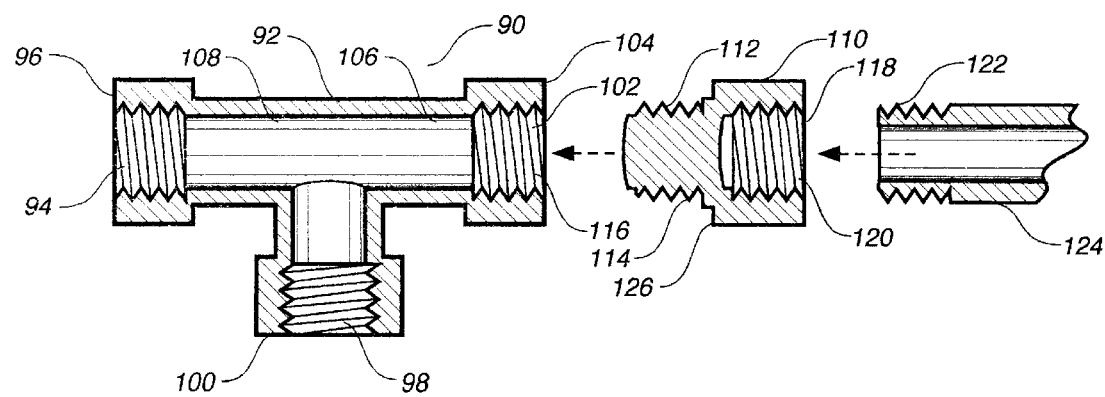
FIG. 4 is a cross-sectional exploded view of an alternative embodiment of the pipe fitting of the present invention.

FIG. 4 shows an alternative embodiment 90 of the pipe fitting of the present invention. The pipe fitting 90 includes a connector body 92 which has a first opening 94 at a first end 96, a second opening 98 at a second end 100 and a third opening 102 at a third end 104. As can be seen, the connector body 92 includes a pathway 106 which extends from the third opening 102 and opens into the fluid passageway 108 extending between the first opening 94 and the second opening 98. As shown in FIG. 4, the connector body 92 is a standard T-shaped connector. However, so as to accomplish the purposes of the present invention, a dead leg receptacle 110 is affixed within the third opening 102 at the third end 104. The dead leg receptacle 110 has a closed portion 112 which will extend into the third opening 102. In particular, the closed portion 112 includes male threads 114 which are received by the female threads 116 in the third opening 102. The closed portion 112 serves to block fluid flow through the pathway 106. The dead leg receptacle 110 includes an orifice 118 formed therein so as to open outwardly of the third end 104 of the connector body 92 when the dead leg receptacle 110 is installed within the third opening 102. The orifice 118 includes threads 120 which serve to receive the male threads 122 at the end of the dead leg pipe 124. In normal use, the dead leg receptacle 110 is initially threaded into the opening 102. A weld can then be made around the area of connection between the third end 104 of the connector body 92 and the shoulder 126 of the dead leg receptacle 110. Another weld can be placed around the connection of the dead leg pipe 124 at the end of the dead leg receptacle 110. The dead leg receptacle can be either welded, glued, sweated, or brazed onto the connector body, depending on the designed application.

The embodiment 90 of the present invention is designed so as to allow for the supply of the product to companies that have large inventories of stock in which to utilize the existing T-shaped connectors before replenishing the stock with the fitting 10 of FIG. 1. The dead leg receptacle 110 can be threaded or socket welded into existing fittings so as to have a similar effect of a fluidless "dead leg" support. The dead leg receptacle 110 is inserted into one end of the T-fittings so as to block any fluids while still leaving an opening for the support pipe. The fitting can be of standard pipe size, depending on the pipe run size and the application to which it is used. It can have female threads or be of a socket welded connection according to the type of installation being carried out. The closed portion 112 of the dead leg receptacle 110 is a solid core which allows no fluid to pass to the dead leg pipe 124. The pipes which are received within the fitting 90 can be standard pipe sizes from one-eighth inch pipe to three inch pipe depending on the application and the pipe run sizes. The exact dimensions are in accordance with ANSI specifications and requirements.

The dead leg receptacle 110, as shown in FIG. 4, provides a dead leg support which is straight and level. It is also less time consuming to install the dead leg support. The dead leg receptacle 110, in combination with the fitting 90, will conform engineering practices and will prevent any fluid from entering the dead leg support. This makes it very cost effective. The materials used for the fitting 90 of FIG. 4 will depend on the fluid application being used.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A pipe fitting comprising:

a T-shaped connector having a first opening at a first end of said connector, a second opening at a second end of the connector, and a third opening at a third end of said connector, said connector having a fluid passageway extending between said first and second openings, said third opening being blocked from fluid communication with said fluid passageway, each of said first, second and third openings being internally threaded so as to threadedly receive pipe sections therein, said first end being offset by 90° from said second end, said fluid passageway having a first portion extending to said first opening transverse to a second portion extending to said second opening, said third end being 180° opposite said first end, said third opening being axially aligned with said first opening, said third opening having a pathway extending and opening to said first portion of said fluid passageway, said connector comprising:

a dead leg receptacle affixed within said third opening at said third end, said dead leg receptacle having a closed portion extending into said third opening so as to block fluid flow through said pathway, said dead leg receptacle having an orifice formed thereon so as to open outwardly of said third end.

2. The pipe fitting of claim 1, said third opening being threaded, said closed portion having threads mating with threads of said third opening, said dead leg receptacle being threadedly received within said third opening.

3. The pipe fitting of claim 2, said orifice of said dead leg receptacle being threaded so as to receive an end of a pipe section.

4. A pipe support system comprising:

a first pipe;

a second pipe;

a dead leg pipe;

a T-shaped connector having a first opening at a first end and a second opening at a second end and a third opening at a third end, said connector having a fluid passageway extending between said first and second openings, said third opening being blocked from fluid communication with said fluid passageway, said first, second and third openings being internally threaded, said first pipe being threadedly affixed within said first opening, said second pipe being threadedly affixed within said second opening, said dead leg pipe being threadedly affixed within said third opening; and a first support rack extending upwardly from a support surface, said first support rack receiving said dead leg pipe therein distal said connector, said dead leg pipe being axially aligned with said first pipe such that said dead leg pipe and said first pipe reside above and in parallel relation to said support surface, said first support rack abutting a surface of said dead leg pipe so as to support at least a portion of a total weight of said pipes and said T-shaped connector.

5. The system of claim 4, further comprising:

a second support rack extending upwardly from a support surface, said second support rack receiving said first pipe therein distal said connector, said connector positioned between said first and second support racks, said second support rack abutting a surface of said first pipe so as to support at least another portion of the total weight of said pipes and said T-shaped connector.

6. The system of claim 4, said first end of said connector being offset by 90° from said second end, said fluid passageway having a first portion extending to said first opening transverse to a second portion extending to said second opening, said third end being 180° opposite said first end, said third opening being axially aligned with said first opening.

7. The system of claim 6, said connector having a blocking section integrally formed between an end of said first portion of said fluid passageway and said third opening.

8. The system of claim 6, said third opening having a pathway extending and opening to said first portion of said fluid passageway, said connector comprising:

a dead leg receptacle affixed within said third opening at said third end, said dead leg receptacle having a closed portion extending into said third opening so as to block fluid flow through said pathway, said dead leg receptacle having an orifice formed thereon so as to open outwardly of said third end, said dead leg pipe affixed within said dead leg receptacle.

9. A pipe support system comprising:

a first pipe;

a second pipe;

a dead leg pipe;

a T-shaped connector having a first opening at a first end and a second opening at a second end and a third opening at a third end, said connector having a fluid passageway extending between said first and second openings, said third opening being blocked from fluid communication with said fluid passageway, said first, second and third openings being internally threaded, said first pipe being threadedly affixed within said first opening, said second pipe being threadedly affixed within said second opening, said dead leg pipe being threadedly affixed within said third opening, said dead leg pipe having a base member affixed to an end of said dead leg pipe opposite said connector, said base member being in abutment with a support surface, said first pipe being an L-shaped pipe having a horizontal portion and a vertical portion; and a support rack extending upwardly from said support surface, said horizontal portion received within said support rack, said vertical portion extending from said horizontal portion to said connector, said support rack abutting a surface of said horizontal portion so as to support at least a portion of a total weight of said pipes and said T-shaped connector.

10. The system of claim 9, said first pipe and said dead leg pipe having longitudinal axes in linear alignment, said longitudinal axes extending transverse to said base member.

11. The system of claim 9, said second pipe extending transverse to said first pipe and said dead leg pipe, said second pipe being connected to a tank at an end opposite said second end of said connector.

* * * * *